United States Patent
Hur et al.

(10) Patent No.: US 7,688,370 B2
(45) Date of Patent: Mar. 30, 2010

(54) ACTIVE PIXEL SENSOR ARRAY

(75) Inventors: Ji-Ho Hur, Seoul (KR); Se-Hwan Kim, Seoul (KR); Jin Jang, Seoul (KR)

(73) Assignee: Silicon Display Technology Co., Ltd., Seoul (KR)

( * ) Notice: Subject to any disclaimer, the term of this patent is extended or adjusted under 35 U.S.C. 154(b) by 1148 days.

(21) Appl. No.: 11/295,373

(22) Filed: Dec. 6, 2005

(65) Prior Publication Data

US 2006/0119718 A1      Jun. 8, 2006

(30) Foreign Application Priority Data

Dec. 6, 2004   (KR)   ................ 10-2004-0101805

(51) Int. Cl.
    *H04N 3/14* (2006.01)
(52) U.S. Cl. ..................................... 348/294
(58) Field of Classification Search ............. 348/222.1, 348/294, 301, 302, 308; 250/208.1, 214 R, 250/214.1
    See application file for complete search history.

(56) References Cited

U.S. PATENT DOCUMENTS 6,603,513  B1 *  8/2003  Berezin ...................... 348/308

2005/0116140  A1    6/2005  Beck et al.

* cited by examiner

*Primary Examiner*—Nhan T Tran
*Assistant Examiner*—Akshay Trehan
(74) *Attorney, Agent, or Firm*—Ladas & Parry LLP

(57) ABSTRACT

Disclosed is an active pixel sensor array, which can reduce the number of elements and the size of capacitors by enabling a reset switching transistor to include a function of an optical sensor and to reset a pixel voltage with a power supply voltage VDD after a gate selection signal is outputted, and to reset a pixel voltage with a power supply voltage VDD by a coupling function in case that a gate selection signal is outputted. The active pixel image sensor having a gate driving circuit and a column driving circuit includes a pixel composed of a voltage supply unit for supplying a signal voltage to the column driving circuit; a gate selection unit for turning on according to a n+1-th gate selection signal and outputting a voltage based on a difference between a pixel voltage and a threshold voltage of the voltage supply unit; a reset switching unit for turning on according to a n+1-th gate selection signal and resetting the pixel voltage with a power supply voltage VDD; and a storage unit and a coupling unit for coupling so as to initialize the pixel voltage to be lower than the power supply voltage VDD just after the n+1-th gate selection signal is outputted.

14 Claims, 9 Drawing Sheets

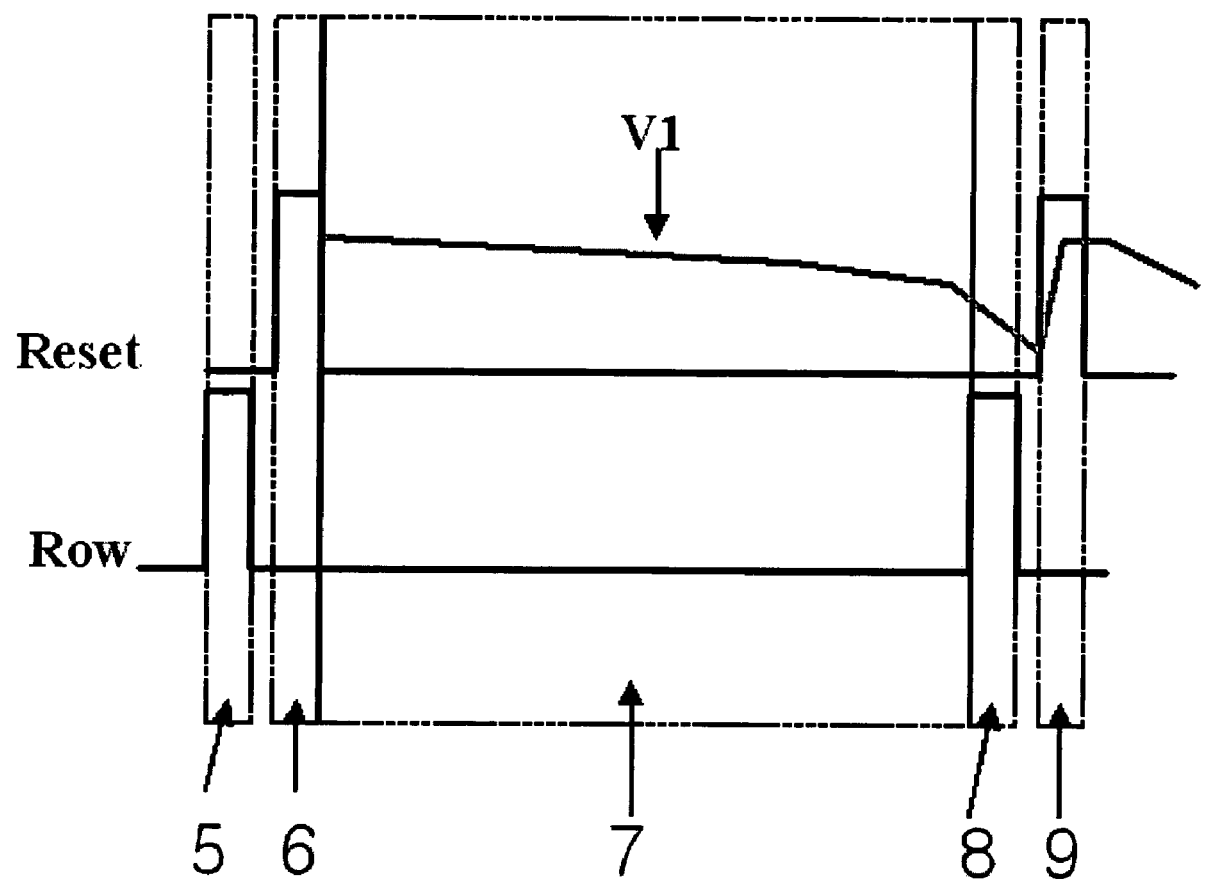

ACTIVE PIXEL SENSOR ARRAY

CROSS REFERENCE TO RELATED APPLICATIONS

The present application claims priority to Korean Patent Application No. 10-2004-0101805 filed on Dec. 6, 2004 which is incorporated herein by reference.

BACKGROUND OF THE INVENTION

1. Field of the Invention

The present invention relates to an active pixel sensor array, and more particularly to an active pixel sensor array which can reduce the number of elements and the size of capacitors by enabling a reset switching transistor to include a function of an optical sensor, resetting a pixel voltage to a power supply voltage VDD after outputting a gate selection signal, and resetting the pixel voltage to be lower than the power supply voltage due to a coupling function when the gate selection signal is outputted.

2. Description of the Prior Art

Recently, various kinds of image sensors including a conventional charge coupled device (CCD) have been developed and commercialized. As representative image sensor, there are a complementary metal oxide silicon (CMOS) image sensor and an image sensor using an amorphous silicon thin-film transistor (TFT).

In order to convert a strength change of a light for each pixel into an electric signal, The image sensor includes a gate driving circuit for selecting a gate, an optical sensor array 1 composed of pixels 2 for converting the strength of the light into a quantity of electric charge, and a column driving circuit 3 for outputting a voltage value obtained by amplifying the quantity of electric charge generated from the optical sensor array 1, as shown in FIG. 1.

A device for obtaining a picture from the image sensor is divided into an active pixel image sensor for amplifying and outputting a change of the quantity of electric charge generated from an optical sensor in which a resistance value is changed according to the strength of the light for a single pixel, and a passive pixel image sensor for outputting the quantity of electric charge through a switching element directly.

First, with reference to FIGS. 2a and 2b, the passive pixel sensor will be now explained.

An electric current generated from an optical sensor due to light is stored in a storage capacitor (C1) during a frame, and is transmitted to a column driving circuit via a data bus line, if a selection switching transistor (T3) is selected. In this case, a signal voltage outputted by dividing the electric charge between a parasitic capacity of the data bus line and the storage capacitor (C1) within the pixel is decreased. This causes a signal-to-noise ratio to decrease.

Accordingly, it is necessary for a high capacity of storage capacitor to reduce or remove the phenomenon that the signal-to-noise ratio is decreased.

However, since a large size is required in case that the high capacity of storage capacitor is used, there is a problem that the storage capacitor isn't proper to a high-resolution image sensor.

In order to solve the above problem, an active pixel sensor for outputting a voltage obtained by amplifying a quantity of signal charge has been developed and used in recent years.

The active pixel image sensor will be explained with reference to FIGS. 3a and 3b.

As illustrated in FIGS. 3a and 3b, the active pixel image sensor for converting the strength of the light into the quantity of electric charge and then amplifying the quantity of electric charge to output a voltage, produces a leak of the electric charge stored in the storage capacitor C1 due to an optical current that is produced by the light in optical sensor, to thereby lower a fixed voltage. The voltage is connected to a gate electrode of a source follower transistor (T2), to lower and outputs a difference voltage between a threshold voltage and a gate voltage in case that the selection switching transistor (T3) is selected. The difference voltage is transferred to a column driving circuit through a data bus line. If a reset switching transistor (T1) is selected, the voltage as much as the power supply voltage VDD is stored in the storage capacitor C1, thereby resetting the pixel voltage.

In other words, as illustrated in FIG. 4, according as a n-th gate line of a m-th frame is selected depending on a first gate line selection signal 5 and the selection switching transistor (T3) is turned on, a voltage as much as a difference between a pixel voltage (V1) and a threshold voltage of the source follower transistor (T2) is transferred to the column driving circuit 4 via the data bus line.

Further, while a first reset signal 6 is outputted, a n-th pixel reset switching transistor (T2) is turned on and a pixel voltage is reset to a power supply voltage VDD.

Meanwhile, the pixel voltage is reduced by generating the optical current due to a photo diode (P1) for a signal accumulation time 7 just before the first reset signal 6 is outputted and a n-th gate selection signal of a m+1-th frame is outputted. The photo diode (P1) may be an optical sensor.

Further, a process is repeatedly performed for selecting a n-th gate line of a m+1-th frame corresponding to a second gate line selection signal, turning on the selected switching transistor T3, and transferring a voltage as much as the difference between the pixel voltage (V1) and a threshold voltage of the source follower transistor (T2) to the column driving circuit 4 through the data bus line.

Further, a process is repeatedly performed for resetting the pixel voltage (V1) to the power supply voltage VDD by turning on the n-th pixel reset switching transistor T2) of the m+1-th frame while a second reset signal 9 is outputted, and simultaneously selecting the n+1-th gate line.

However, since the active pixel image sensor, since three transistors, one capacitor, one optical sensor, two selection lines, and two power supplies are required, a high integration of the active pixel image sensor is reduced.

SUMMARY OF THE INVENTION

Accordingly, the present invention has been made to solve the above-mentioned problems occurring in the prior art, and an object of the present invention is to provide an active pixel sensor array which can efficiently reduce the number of elements and the size of capacitors by enabling a reset switching transistor to include a function of an optical sensor, resetting a pixel voltage with a power supply voltage VDD after a gate selection signal is outputted, and resetting a pixel voltage with a power supply voltage VDD by a coupling function of capacitors when a gate selection signal is outputted.

Additional advantages, objects, and features of the invention will be set forth in part in description which follows and in part will become apparent to those having ordinary skill in the art upon examination of the following or may be learned from practice of the invention.

In another aspect of the present invention, an active pixel sensor having a gate driving circuit and a column driving circuit includes a pixel composed of a voltage supply unit for supplying a signal voltage to a column driving circuit; a gate selection unit for outputting a voltage based on the difference between a pixel voltage and a threshold voltage of the voltage supply unit to a column driving circuit through a data bus line; a reset switching unit for turning on according to a n+1-th gate selection signal and resetting the pixel voltage with a power supply voltage VDD; and a storage unit and a coupling unit for coupling so as to initialize the pixel voltage to be reset to be lower than the power supply voltage VDD directly after the n+1-th gate selection signal is outputted.

In still another aspect of the present invention, an active pixel image sensor having a gate driving circuit and a column driving circuit includes a pixel composed of a voltage supply unit for supplying a signal voltage to a column driving circuit; a gate selection unit for turning on according to a n+1-th gate selection signal and outputting a voltage based on the difference between a pixel voltage and a threshold voltage of the voltage supply unit to a column driving circuit through a data bus line; a reset switching unit for turning on according to a n+1-th gate selection unit and resetting the pixel voltage with the power supply voltage VDD; a storage unit in which on end is connected to the voltage supply unit, the other end being connected to a power supply voltage; a coupling unit in which one end is connected to the reset switching unit, the other end being connected to the rest switching unit; and an auxiliary unit in which one end is connected between the other end of the coupling unit and the voltage supply unit, the other end being connected to an earth.

BRIEF DESCRIPTION OF THE DRAWINGS

The above and other objects, features and advantages of the present invention will be more apparent from the following detailed description taken in conjunction with the accompanying drawings, in which:

FIG. 4 is a view illustrating the voltage timing for driving a conventional active pixel image sensor;

DETAILED DESCRIPTION OF THE PREFERRED EMBODIMENTS

Figure 1:
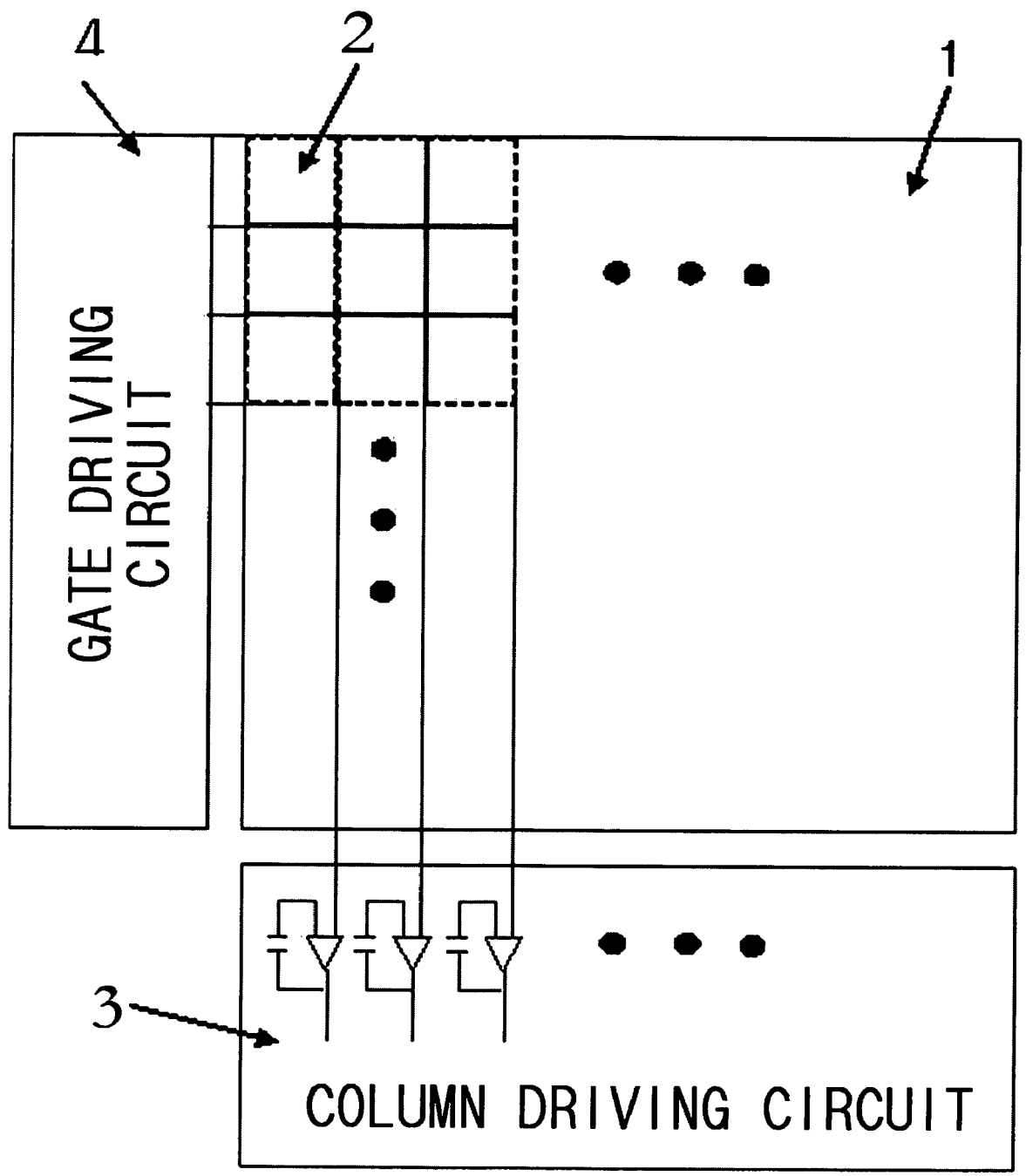
FIG. 1 is a view illustrating the configuration of a general image sensor.
Figure 2A:
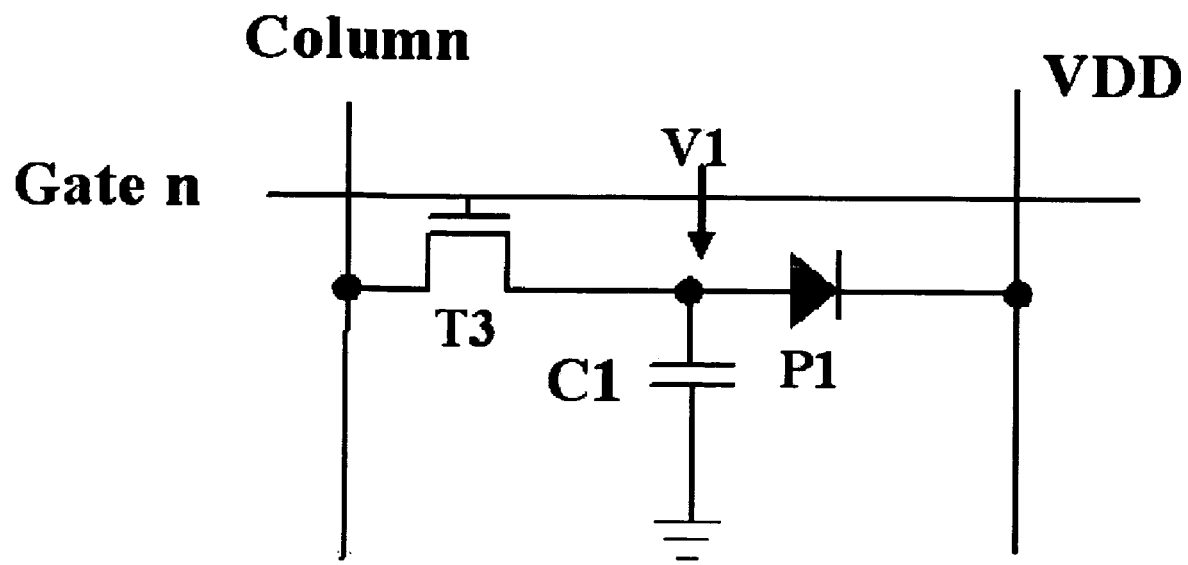
FIG. 2a is a view illustrating an equivalent circuit of a unit pixel of a general passive pixel image sensor using a photo diode.
Figure 2B:
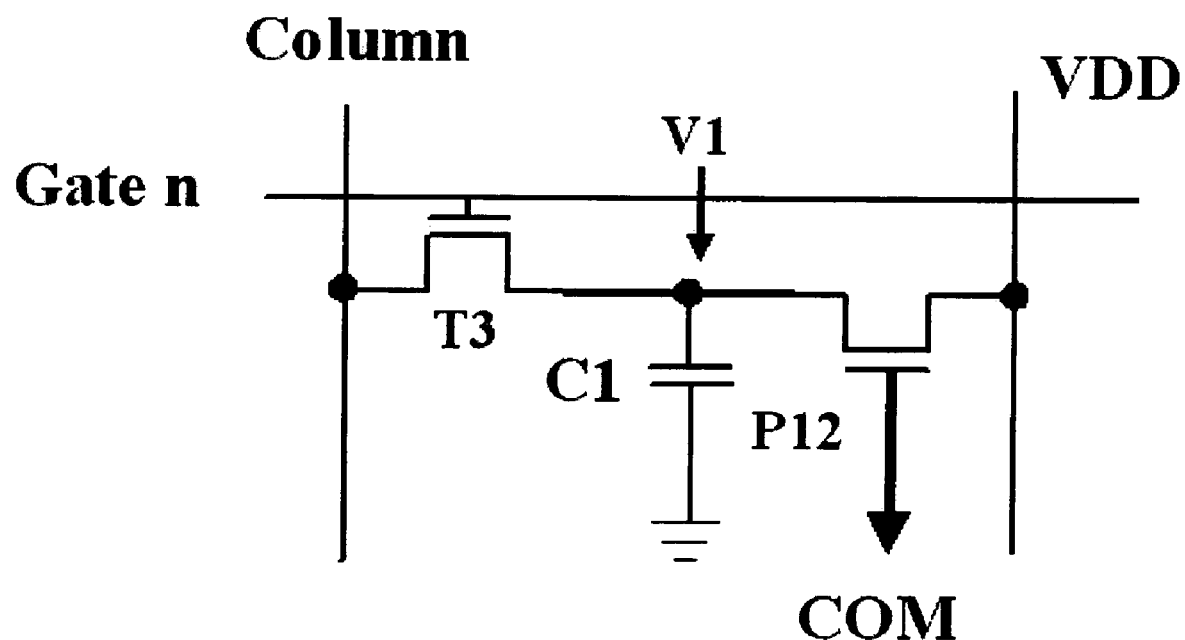
FIG. 2b is a view illustrating an equivalent circuit of a unit pixel of the general passive pixel image sensor using a TFT optical sensor
Figure 3A:
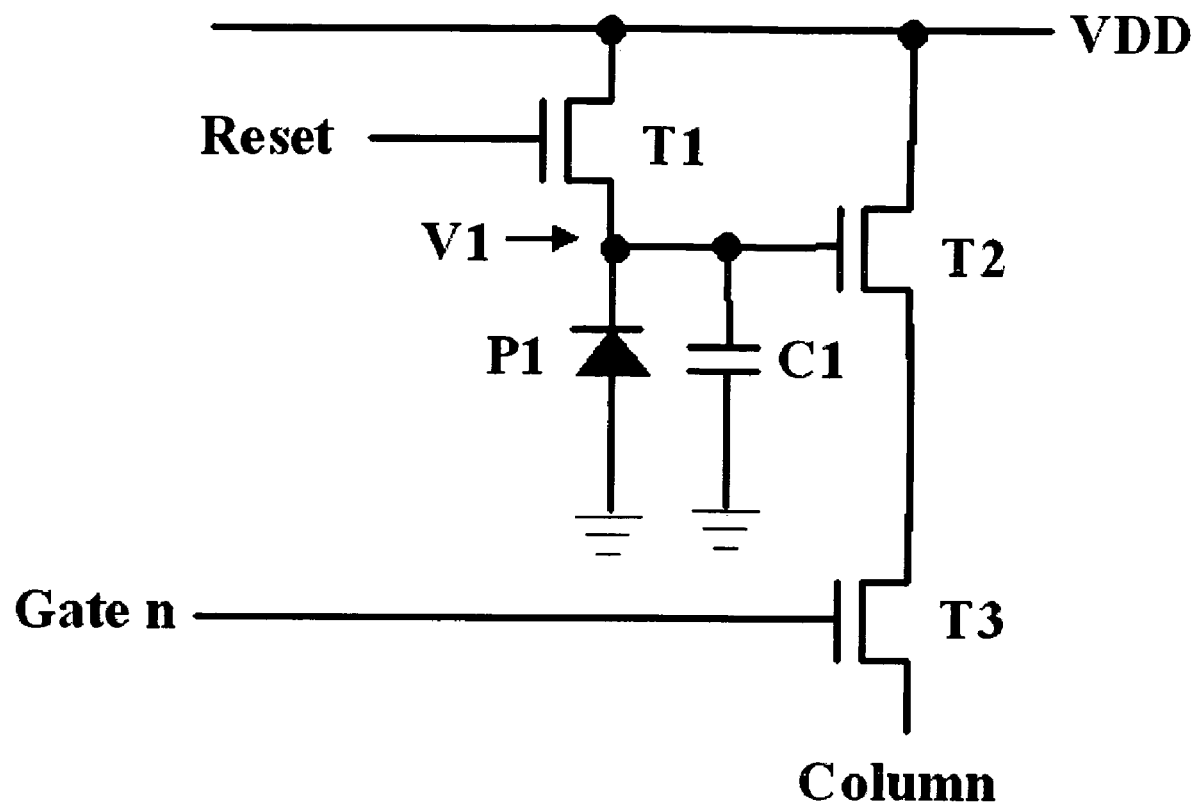
FIG. 3a is a view illustrating an equivalent circuit of a unit pixel of a general active pixel image sensor using a photo diode.
Figure 3B:
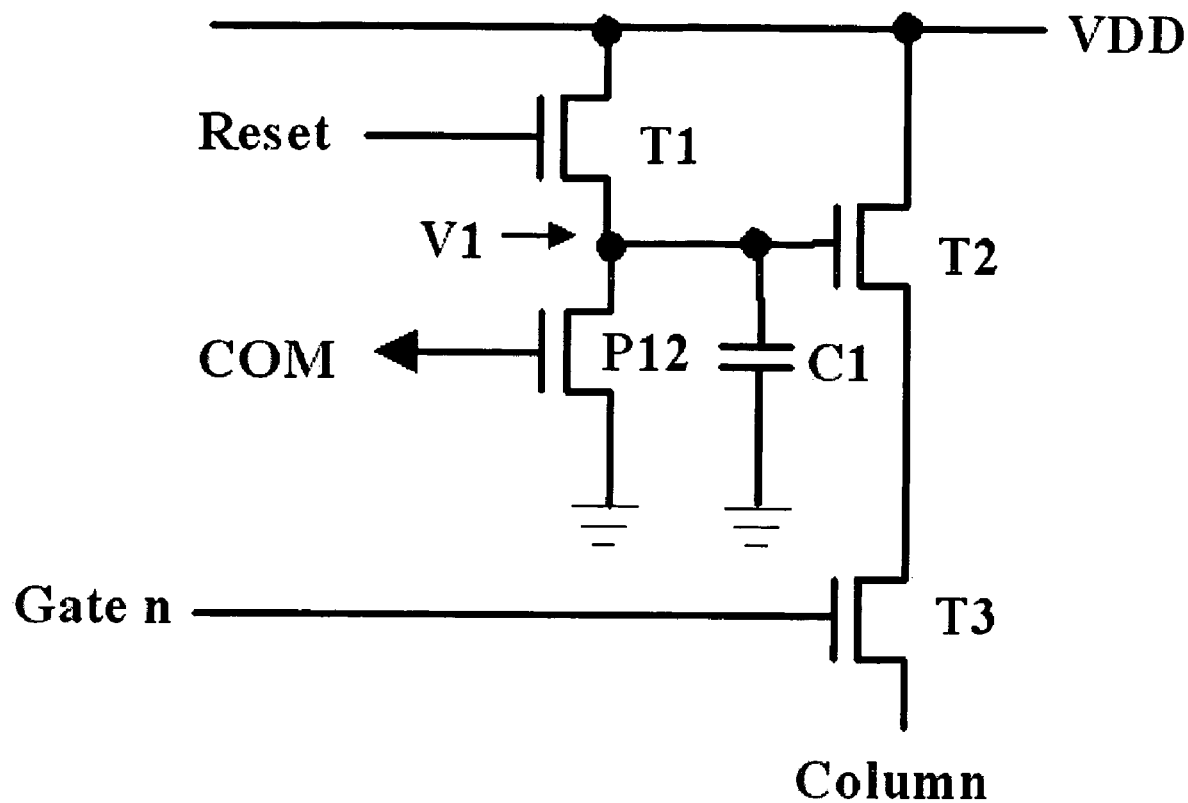
FIG. 3b is a view illustrating an equivalent circuit of a unit pixel of the general active pixel image sensor using a TFT optical sensor.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as detailed construction and elements, are nothing but specific details provided to assist those ordinary skilled in the art in a comprehensive understanding of the invention, and the present invention is only defined within the scope of appended claims. In the whole description of the present invention, the same drawing reference numerals are used for the same elements across various figures.

Before the present invention is explained, one of a source electrode and a drain electrode of a transistor according to the present invention is referred to a first electrode, and the other is referred to a second electrode. Additionally, a first n-th gate signal applied to the present invention is referred to a signal for selecting a n-th gate line of a m-th frame, a second n-th gate signal is referred to a signal for selecting a n-th gate line of a m+1-th frame, a first n+1-th gate signal is referred to a signal for selecting a n+1-th gate line of a m-th frame and is used as a signal for resetting a n-th pixel of the m-th frame, and a second n+1-th gate signal is referred to a signal for selecting a n+1-th gate line of a m+1-th frame and is used as a signal for resetting a n-th pixel of the m+1-th frame.

The construction of the active pixel sensor array according to the present invention will now be explained with reference to FIGS. 5a to 5c.

Figure 5A:
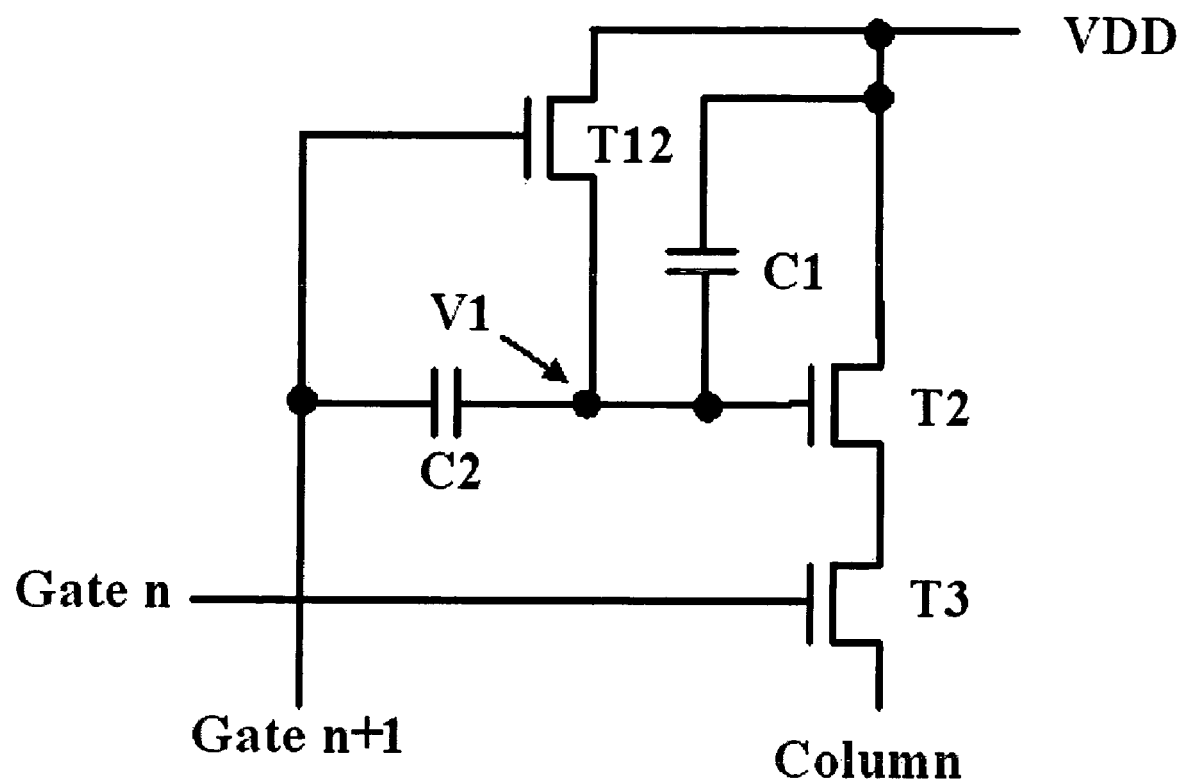
FIG. 5a is a view illustrating an equivalent circuit of a unit pixel of an active pixel image sensor according to an embodiment of the present invention.

FIG. 5a is a view illustrating an equivalent circuit of a unit pixel of an active pixel image sensor according to an embodiment of the present invention.

Referring to FIG. 5a, the active pixel sensor array may include a source follower transistor (T2), a selection switching transistor (T3) for turning on depending on a n-th gate selection signal 50 and outputting a voltage based on the difference between a pixel voltage (V1) and a threshold voltage of the source follower transistor (T2) to a column driving circuit through a data bus line, a reset switching transistor (T12) for setting the pixel voltage (V1) to a power supply voltage VDD by being turned on depending on a n+1-th gate selection signal, and a first and a second capacitor C1, C2 for coupling so as to reset the pixel voltage to be lower than the power supply voltage VDD directly after the n+1-th gate signal is outputted.

The reset switching transistor (T12) also includes a function of an optical sensor.

Further, a gate electrode of the n-th reset switching transistor (T12) is connected to a n+1-th and more gate line.

In this case, one end of the first capacitor (C1) is connected to a gate end of the source follower transistor (T2), the other end being connected to a power supply voltage VDD. One end of the second capacitor (C2) is connected to the source follower transistor (T2) together with the first capacitor (C1), the other end being connected to a gate end of a reset switch (T12).

Figure 5B:
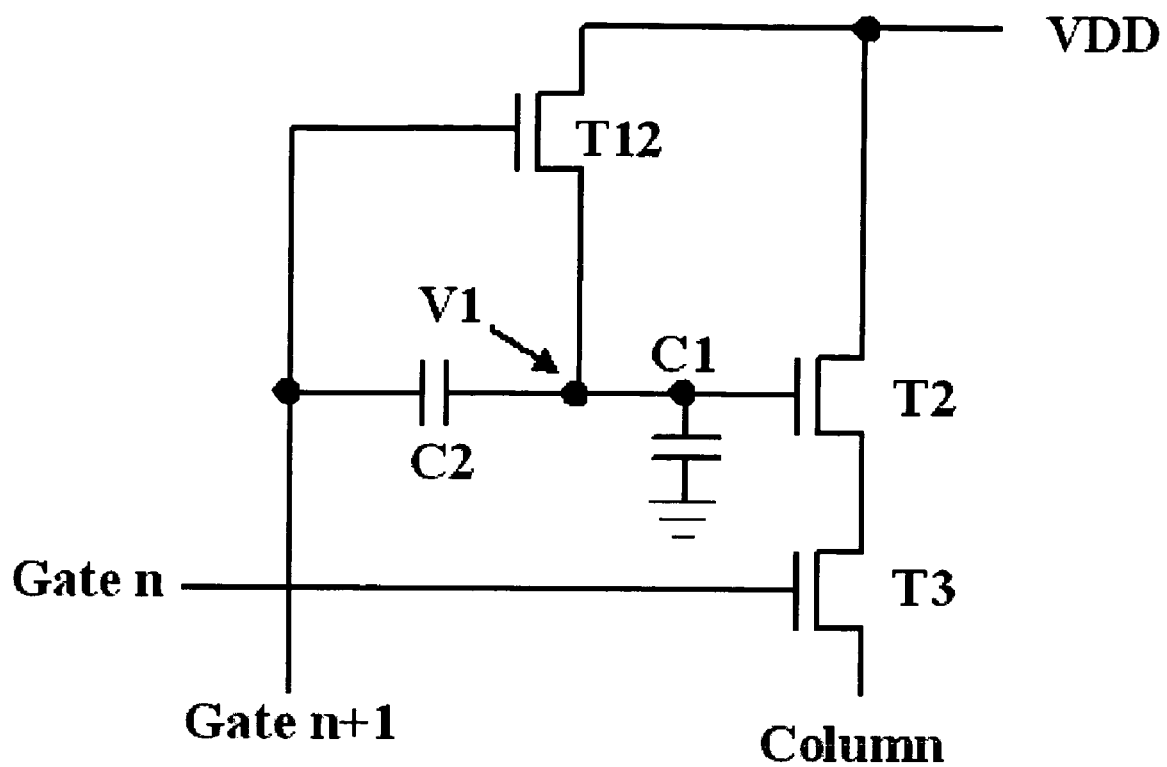
FIG. 5b is a view illustrating an equivalent circuit of a unit pixel of the active pixel image sensor according to the present invention.

FIG. 5b is a view illustrating an equivalent circuit of a unit pixel of the active pixel image sensor according to the present invention.

Referring to FIG. 5b, the source follower transistor (T2), the selection switching transistor (T3) and the reset switching transistor (T12) are operated as the same as the embodiment of FIG. 5a. A connection construction of the first and the second capacitor C1, C2 is different from that of the embodiment of FIG. 5a. In other words, as illustrated in FIG. 5b, one end of the first capacitor (C1) is connected to a gate end of the source follower transistor (T2), and the other end is connected to an earth. One end of the second capacitor (C2) is connected to the source follower transistor (T2) together with the first capacitor (C1), and the other is connected to a gate end of the reset switch (T12).

Figure 5C:
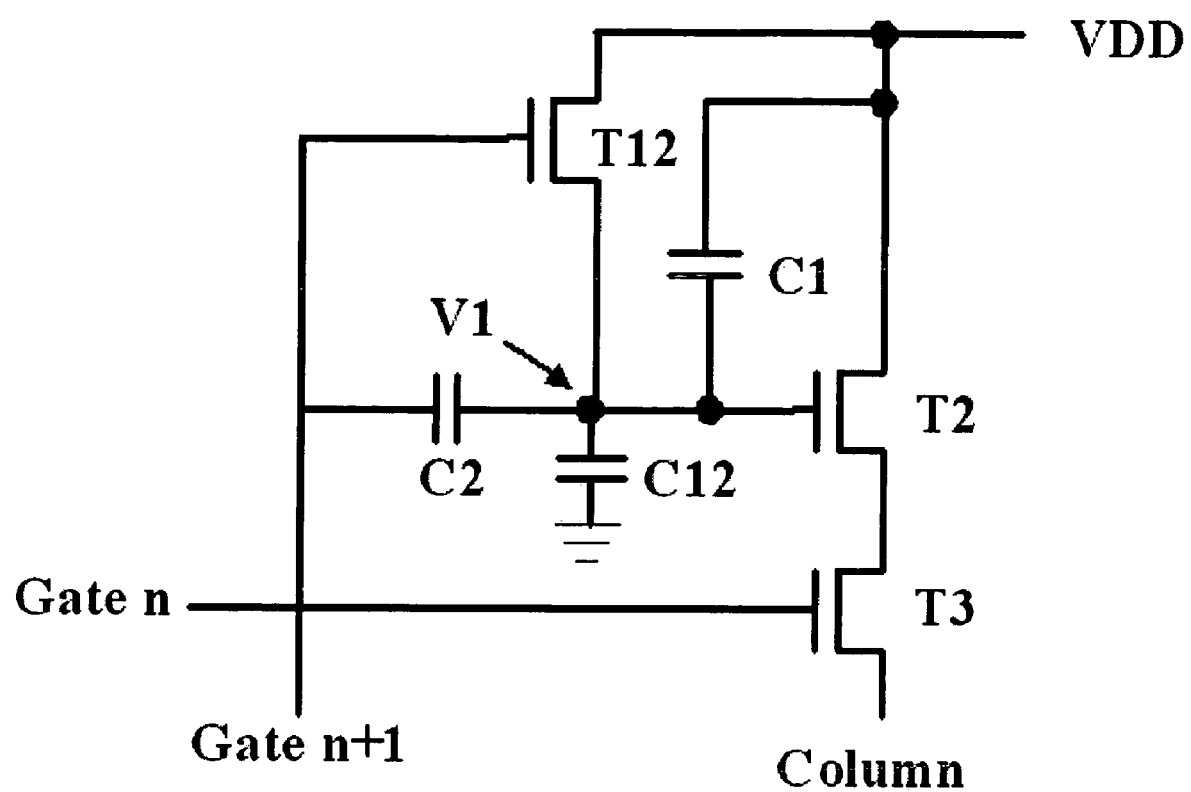
FIG. 5c is a view illustrating an equivalent circuit of a unit pixel of the active pixel image sensor according to the present invention.

FIG. 5c is a view illustrating an equivalent circuit of a unit pixel of the active pixel image sensor according to the present invention.

Referring to FIG. 5c, the source follower transistor (T2), the selection switching transistor (T3), and the reset switching transistor (T12) are operated as the same as the embodiment of FIG. 5a. the equivalent circuit additionally includes the first capacitor (C1) in which one end is connected to a gate end of the source follower transistor (T2) and the other end is connected to a power supply voltage VDD, the second capacitor (C2) in which one end is connected to the source follower transistor (T2) together with the first capacitor (C1) and the other end is connected to a gate end of the reset switch (T12), and a third capacitor (C12) in which one end is connected between the other end of the second capacitor (C2) and a gate end of the source follower transistor (T2) and the other end is connected to a ground.

A gate electrode of the reset switch (T12) is connected to a gate electrode of a n+1-th selection switching transistor, and the reset switch (T12) resets a pixel voltage when a n+1-th gate line is selected.

The source follower transistor (T2), the selection switching transistor (T3) and the reset switching transistor (T13) are respectively an amorphous silicon TFT, a polycrystalline silicon TFT, or a thin film transistor TFT on which an amorphous silicon and a polycrystalline silicon are mixed and formed.

The reset switch (T12) is folded between a gate electrode and a source/drain electrode, or includes an offset area.

Further, a first electrode of the reset switching transistor (T12) and a second electrode of the source follower transistor (T2) are commonly connected to a power supply voltage VDD.

The reset switching transistor (T12) plays a role of an optical sensor.

The first capacitor (C1) is a storage capacitor, the second capacitor (C2) is a coupling capacitor, and the third capacitor (C12) is an auxiliary storage capacitor.

The active pixel sensor array as above configured will be explained with reference to FIGS. 5 and 6.

Figure 6:
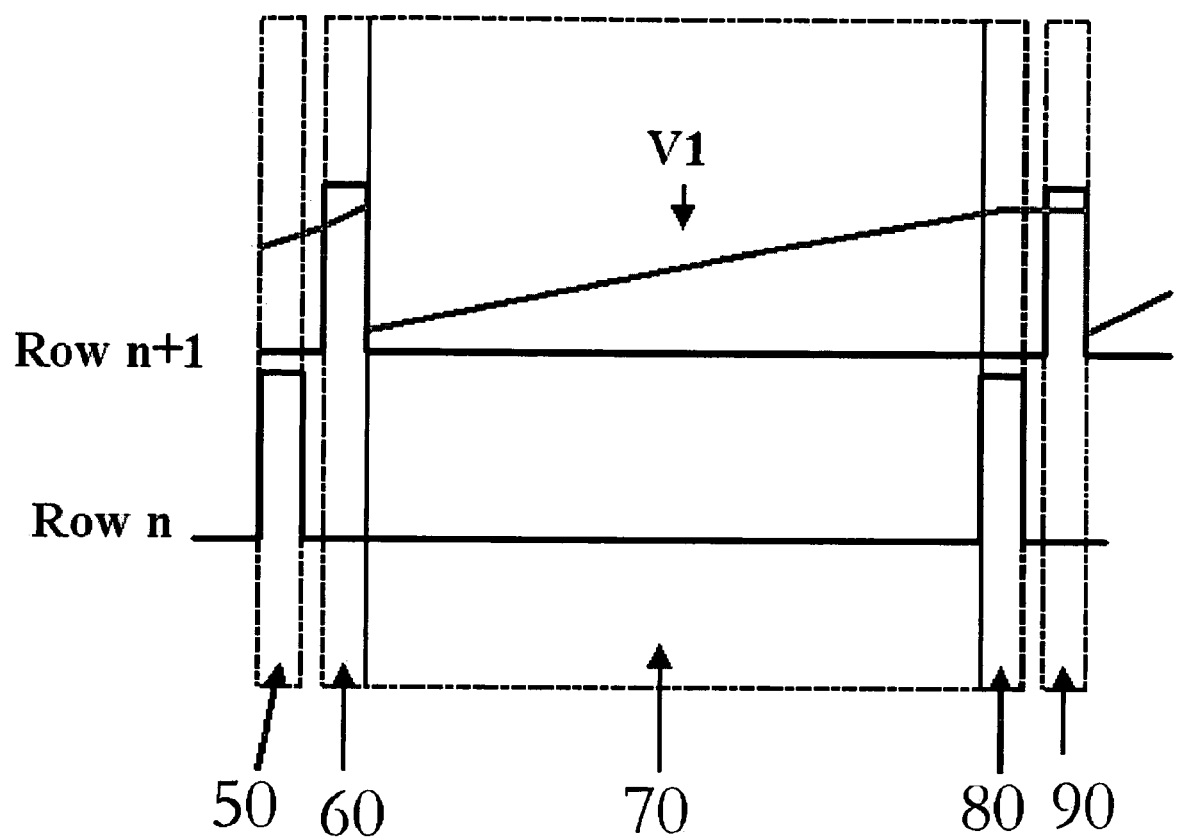
FIG. 6 is a view illustrating the voltage timing for driving the active pixel image sensor according to the present invention.

First, referring to FIG. 6, a n-th selection switching transistor (T3) is turned on by enabling a n-th gate line of a m-th frame to be selected by a first n-th gate selection signal 50. A voltage based on the difference between a pixel voltage (V1) and a threshold voltage of the source follower transistor (T2) is transmitted to a column driving circuit through a data bus line.

Further, a n+1-th selection switching transistor (T3) is turned on according as a n+1-th gate line of a m-th frame is selected by a first n+1-th gate selection signal 60. A voltage based on the difference between the pixel voltage (V1) and the threshold voltage of the source follower transistor (T2) is transferred to the column driving circuit, and simultaneously turns on n-th reset switch T12 and sets the image voltage connected with the gate end of the n-th source follower transistor T2 to the power supply voltage VDD.

Further, if a gate voltage of the n-th reset transistor (T12) of the m-th frame is falling down under a boundary of a signal accumulation time 70 just before the first n+1-th gate selection signal 60 is outputted and a second n-th gate selection signal 80 of a m+1-th frame is outputted, the coupling capacitor (C2) and the storage capacitor (C1) are coupled and thus a change of the pixel voltage (V1) as much as C2☐ gate voltage change/(C1+C2) is produced, thereby being reset to be lower than the power supply voltage VDD.

Meanwhile, the pixel voltage is increased by enabling an optical leakage current to be generated by the reset switching transistor (T12) according to the signal accumulation signal 70.

Further, a process is repeatedly performed that, if the n-th gate line of the m+1-th frame is selected corresponding to the second n-th gate line selection signal 80, a voltage based on the difference between the pixel voltage (V1) and the threshold voltage of the source follower transistor (T2) is transmitted to the column driving circuit through a data bus line.

Finally, a process is repeatedly performed for transferring a voltage based on the difference between the pixel voltage (V1) and the threshold voltage of the source follower transistor (T12) to the column driving circuit by enabling the n+1-th selection switching transistor (T3) to be turned on according as the n+1-th gate line of the m-th frame is selected by a second n+1-th gate selection signal 90, and simultaneously setting the pixel voltage (V1) connected to the gate end of the n-th source follower transistor (T2) to the power supply voltage VDD by enabling the n-th reset switch (T12) to be turned on.

As described above, the active pixel sensor array according to the present invention resets the gate voltage of the source-follower transistor of N-th pixel to a fixed voltage, when N+1-th pixel is selected, resets so as to initialize the gate voltage of the source follower transistor to be decreased to a predetermined voltage due to an influence of a feedthrough voltage by sharing an electrode of two capacitors, and outputs the voltage through a data bus line by enabling the electric charge to be charged to two capacitors and a gate electrode of the source follower transistor due to an optical leakage current of the reset switching transistor according to a signal of light, thereby being capable of manufacturing a high-resolution active pixel image sensor without being provided with a specific optical sensor and a common electrode for setting.

The preferred embodiments of the present invention have been described for illustrative purposed, and those skilled in the art will appreciate that various modifications, additions and substitutions are possible, without departing from the scope and spirit of the invention as disclosed in the accompanying claims.

What is claimed is:

1. An active pixel image sensor having a gate driving circuit and a column driving circuit, wherein an active pixel sensor array includes a pixel comprising:
    a voltage supply unit for supplying a signal voltage to a column supply circuit;
    a gate selection unit for turning on according to a n-th gate selection signal and outputting a signal voltage based on a difference between a pixel voltage and a threshold voltage of the voltage supply unit;
    a reset switching unit for turning on according to a n+1-th gate selection signal and setting the pixel voltage with a power supply voltage VDD; and a storage unit and a coupling unit for coupling so as to initialize a pixel voltage to be lower than the power supply voltage VDD just after the n+1-th gate selection signal is outputted.

2. The active pixel sensor array as claimed in claim 1, wherein the power supply unit is a source follower transistor (T2), the gate selection unit is a selection switching transistor (T3), the reset switching unit is a reset switching transistor (T12), the storage unit is a first switching capacitor (T1), and the coupling unit is a second capacitor.

3. The active pixel sensor array as claimed in claim 2, wherein the reset switching transistor (T12) includes a function of an optical sensor.

4. The active pixel sensor array as claimed in claim 1, wherein one end of the storage unit is connected to the power supply unit, the other end being connected to a power supply voltage, and one end of the coupling unit is connected to the voltage supply unit together with the storage unit, the other end being connected to the reset switching unit.

5. The active pixel sensor array as claimed in claim 1, wherein one end of the storage unit is connected to the voltage supply unit, the other end being connected to an earth, and one end of the coupling unit is connected to the voltage supply unit together with the storage unit, and the other end being connected to the reset switching unit.

6. An active pixel image sensor having the gate driving circuit and the column driving circuit, wherein the active pixel sensor array includes a pixel comprising:
   a voltage supply unit for supplying a signal voltage to a column driving circuit;
   a gate selection unit for turning on according to a n-th gate selection signal and outputting a voltage based on a difference between a pixel voltage and a threshold voltage of the voltage supply unit to a column driving circuit through a data bus line;
   a reset switching unit for turning on according to a n+1-th gate selection signal and setting the pixel voltage to a power supply voltage;
   a storage unit in which one end is connected to the voltage supply unit, and the other end is connected to the power supply voltage;
   a coupling unit in which one end is connected to the voltage supply unit together with the storage unit, and the other end is connected to the reset switching unit; and
   an auxiliary storage unit in which one end is connected between the other end of the coupling unit and the voltage supply unit, and the other end is connected to an earth.

7. The active pixel sensor array as claimed in claim 6, wherein the voltage supply unit is a source follower transistor (T2), the gate selection unit is a selection switching transistor (T3), the reset switching unit is a reset switching transistor (T12), the storage unit is a first capacitor (C1), the coupling unit is a second capacitor (C2), and the auxiliary storage unit is a third capacitor (C12).

8. The active pixel sensor array as claimed in claim 7, wherein the reset switching transistor (T12) includes a function of an optical sensor.

9. The active pixel sensor array as claimed in claim 2 or 7, wherein a gate electrode of the reset switch (T12) resets a pixel voltage in case that a n+1-th gate line is selected, by being connected to a gate electrode of a n+1-th selection switching transistor.

10. The active pixel sensor array as claimed in claim 2 or 7, wherein the source follower transistor (T2), the selection switching transistor (T3) and the reset switching transistor (T13) are an amorphous silicon TFT or a polycrystalline silicon TFT, or a thin-film transistor TFT on which an amorphous silicon and a polycrystalline silicon are mixed and formed.

11. The active pixel sensor array as claimed in claim 2 or 7, wherein the reset switch (T12) is folded between a gate electrode and a source/drain electrode, or includes an offset area.

12. The active pixel sensor array as claimed in claim 2 or 7, wherein a first electrode of the reset switching transistor (T12) and a second electrode of the source follower transistor (T2) are commonly connected to a power supply voltage VDD.

13. The active pixel sensor array as claimed in claim 2 or 7, wherein a gate electrode of the n-th reset switching transistor is connected to a n+1-th and more gate line.

14. The active pixel sensor array as claimed in claim 2 or 7, wherein a first electrode of the reset switching transistor and a second electrode of the source follower transistor are commonly connected to a power supply electrode.

* * * * *